United States Patent [19]

Morikawa et al.

[11] Patent Number: 5,354,571
[45] Date of Patent: Oct. 11, 1994

[54] METHOD FOR ALIGNING AND BENDING INDIVIDUAL ROUND ELONGATED DOUGH PIECES

[75] Inventors: Michio Morikawa; Torahiko Hayashi; Nobuyuki Saito, all of Utsunomiya, Japan

[73] Assignee: Rheon Automatic Machinery Co., Ltd., Japan

[21] Appl. No.: 49,528

[22] Filed: Apr. 20, 1993

[30] Foreign Application Priority Data

Apr. 27, 1992 [JP] Japan .................. 4-134138
Apr. 28, 1992 [JP] Japan .................. 4-135887

[51] Int. Cl.$^5$ ............................ A21D 6/00
[52] U.S. Cl. ............................ 426/496; 99/450.1; 198/379; 198/468.3; 414/783; 426/502; 426/512
[58] Field of Search ............ 426/496, 502, 512; 99/450.1; 198/379, 468.3; 414/783; 425/383

[56] References Cited

U.S. PATENT DOCUMENTS 4,036,569  7/1977  Oshikiri .................. 425/140
4,582,472  4/1986  Hanson .................... 425/139
5,169,664  12/1992 Ueno et al. ............... 426/512

FOREIGN PATENT DOCUMENTS

642641    3/1937  Fed. Rep. of Germany .
4039793A1 7/1991  Fed. Rep. of Germany ..... A21C 3/06
2-83780   6/1990  Japan .................. A21C 9/08
3-2513    1/1991  Japan .................. B65G 47/28
3-44114   4/1991  Japan .................. B65G 43/00
8800402   9/1989  Netherlands ............. A21C 11/00

Primary Examiner—George Yeung
Attorney, Agent, or Firm—Limbach & Limbach

[57] ABSTRACT

A device (24) for aligning with a feeding line (8) of a moving transfer conveyor (3) and for bending a round elongated dough piece (13) randomly placed on the moving transfer conveyor for transfer, comprising a pair of stoppers (26, 26) symmetrically arranged in a funnel-shape above the moving transfer conveyor (3) so that the dough piece (13) can be moved to a central position between the stoppers (26) and (26). The stoppers are rotatable to bend the dough piece (13) and movable to release it on the moving transfer conveyor.

7 Claims, 9 Drawing Sheets

METHOD FOR ALIGNING AND BENDING INDIVIDUAL ROUND ELONGATED DOUGH PIECES

BACKGROUND OF THE INVENTION

1. Field of the Invention

This invention relates to a method and a device for aligning with a feeding line of a transfer conveyor, and bending, a round elongated, or conically- or cylindrically-shaped, dough piece such as a croissant or French roll dough piece placed randomly on the transfer conveyor.

2. Description of the Prior Art

During a dough-shaping process the dough pieces may be randomly placed on a moving transfer conveyor. Thus, they may face in different directions and are not on the feeding line of the transfer conveyor. Therefore, they must be aligned or centered for further processing such as bending.

Relating to dough-alignment or centering devices, some Japanese patents are known. A Japanese patent, JP (Y2) 3-2513, discloses a centering device for centering bread dough pieces transferred on a transfer conveyor. The device includes a pair of rotatable guide plates. The plates guide the dough pieces to the center of the transfer conveyor and prevent them from dropping from the conveyor.

Another Japanese patent, JP (U) 2-83780, discloses a dough-alignment device. The device includes a stopper comprised of bent plates to block a plurality of dough pieces. The stopper is vertically movable toward and away from a transfer conveyor. The conveyor belt of the transfer conveyor is vibrated at a position near its upstream end, at which position the stopper is located, so that the dough pieces are aligned with relative to the advancing direction.

Another Japanese patent, JP (U) 3-44114, teaches detecting the position of a dough piece in its lateral direction by means of image sensors and transferring the dough piece in the lateral direction by a transversely moving conveyor so as to align the dough piece in the longitudinal direction.

Relating to dough-bending devices, a Netherlands patent application, No. 8800402, and a German patent, DE 4039793 A1, disclose devices to bend a rolled-up croissant dough piece from its ends.

It is difficult for these bending devices, however, to bend a croissant dough piece at its center. Therefore, the bent dough is asymmetrical, and defective as a product. Further, these devices have a complicated structure.

The purpose of the present invention is to provide a simple device and a method for reliably and easily aligning and/or bending dough pieces.

SUMMARY OF THE INVENTION

The present invention provides a method for aligning a round elongated dough piece with a feeding line of a transfer conveyor, comprising the steps of moving a transfer conveyor so as to transfer the round elongated dough piece placed randomly on the conveyor; and arranging a pair of stoppers above the transfer conveyor such that the stoppers are symmetrically inclined with respect to the feeding line so as to block the round elongated dough piece. As the conveyor is moving, the dough piece, which is not on the feeding line and is blocked by the stoppers, begins to roll at that position, and move transversely onto the feeding line. Thus, the dough piece is made to be positioned such that the longitudinal axis of the dough piece is perpendicular to the feeding line and that the center of the dough piece is aligned with the feeding line.

The method further comprises the steps of holding the dough piece at its central portion and moving the stoppers inwardly to bend the dough piece. The dough piece is aligned and bent on the same conveyor.

The aligning device of the present invention aligns with a feeding line of a transfer conveyor a round elongated dough piece randomly placed on the transfer conveyor for the transfer. The aligning device comprises a pair of stoppers disposed above the transfer conveyor so as to block and release the dough piece on the moving conveyor. The stoppers are movable between blocking and releasing positions. At the blocking position the stoppers are symmetrically inclined with respect to the feeding line in the shape of a funnel and at the releasing position allow the dough piece to be conveyed downstream on the transfer conveyor without being blocked by the stoppers.

The aligning device may include a pair of stopper plates, each of which is rotatable about a vertical axis so as to move between the blocking and releasing positions.

One of the aligning and bending devices of the present invention aligns with a transfer line of a transfer conveyor and bends a piece of round elongated dough piece randomly placed on the transfer conveyor for the transfer. The device includes a pair of stoppers disposed above the transfer conveyor and a holding member disposed at a central position between the stoppers. The stoppers move between blocking and releasing positions. At the blocking position the stoppers are symmetrically inclined with respect to the feeding line in the shape of a funnel so as to block the dough piece, thereby causing it to roll on the moving transfer conveyor and to move onto the feeding line. After the dough piece is aligned with the feeding line, the stoppers move inwardly to bend the aligned dough in association with the holding member.

The stoppers, in an embodiment, may be moved outwardly into the releasing position to allow the dough piece to be conveyed downstream on the transfer conveyor without being blocked by the stoppers.

The stoppers, in an embodiment, may be moving belts wound around rollers, which release or move the dough piece downstream.

The bent dough piece may be passed between a pair of press belts disposed downstream of the stoppers so that bending the dough piece can be reliably completed.

Another aligning and bending device of the present invention includes such an aligning device that aligns a round elongated dough piece with the feeding line of the transfer conveyor, and a bender that receives the aligned dough from the aligning device and bend it by moving inwardly. A movable holding belt device may be disposed between the aligning device and the bender. During the transfer of the dough piece from the aligning device to the bender the holding belt device holds the top portion of the aligned dough piece to prevent the aligned dough piece from moving out of the feeding line.

DESCRIPTION OF THE PREFERRED EMBODIMENTS

The present invention will now be explained through embodiments with reference to the accompanying drawings. In the embodiments the same numbers are used for the same elements which function in the same manner.

Figure 1:
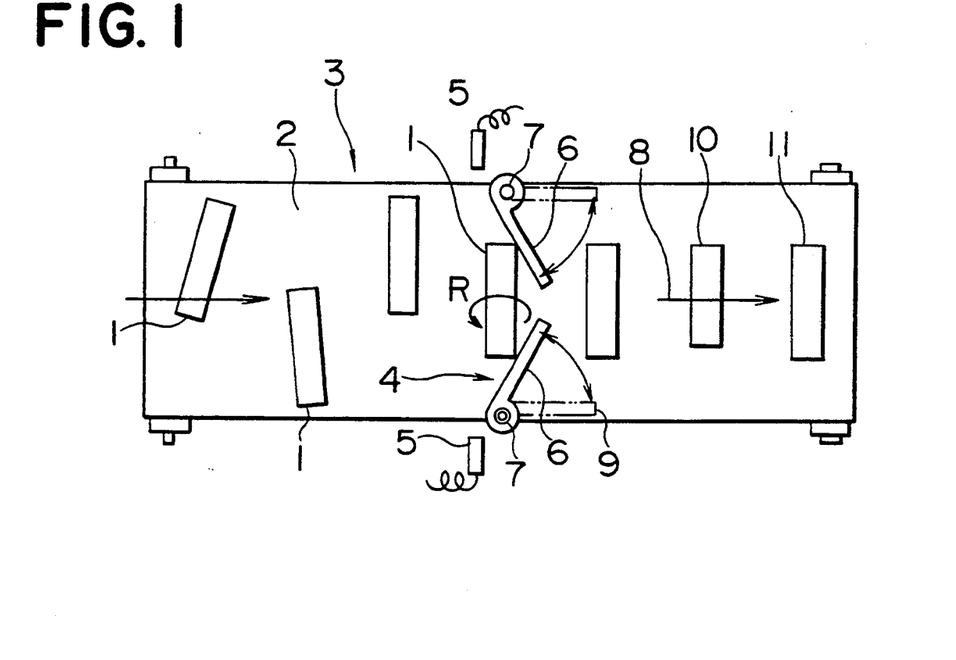
FIG. 1 is a schematic plan view of a dough-aligning device of the invention mounted on a transfer conveyor carrying round elongated dough pieces.
Figure 2:
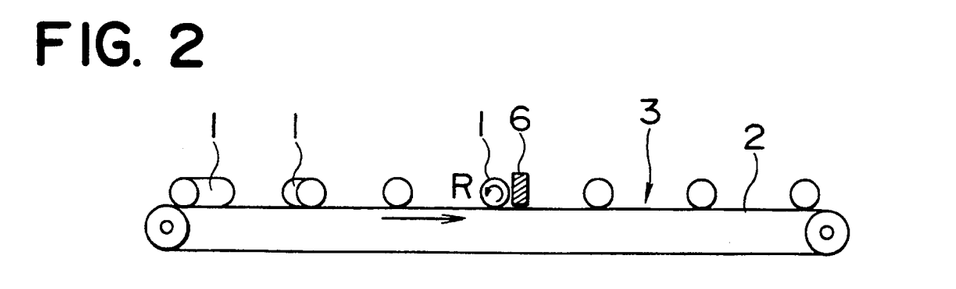
FIG. 2 is a sectional side view of FIG. 1.

In FIGS. 1 and 2 a plurality of round elongated dough pieces 1 are transferred on the conveyor belt 2 of a transfer conveyor 3. The cross section of each dough piece is nearly round. The dough pieces 1, which may be different in size and length, are randomly placed on the moving conveyor belt 2.

Figure 6:
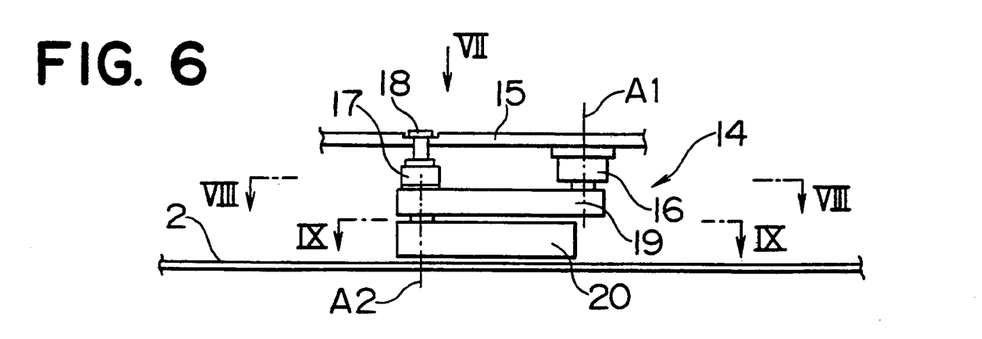
FIG. 6 is a sectional side view of the device and a part of the frame taken along line VI—VI of FIG. 5.

An aligning device 4 is suspended from a frame (see FIG. 6) secured to the transfer conveyor 3. The device aligns the individual dough pieces with a feeding line 8 of the transfer conveyor. The feeding line is an imaginary line running in the middle of the transfer conveyor in the longitudinal direction, and the dough pieces are designed to be conveyed in alignment with the feeding line. The device 4 includes a pair of stoppers 6, which are formed, for example, in the shape of plates. The stopper plates 6 are symmetrically arranged about the feeding line 8. Each stopper plate is pivotally mounted at one end on a pin 7 and moved, by means of a known actuator (not shown), between a blocking position, shown in continuous lines in FIG. 1, and a releasing position 9, shown in an imaginary outline in FIG. 1. The dough pieces 1, which may face in different directions and are not on the feeding line 8 of the conveyor 3, are each detected by a photoelectric switch 5 when it approaches the stopper plates 6.

When a dough piece 1 approaches the stopper plates 6, they are pivoted from the releasing position inwardly to the blocking position by the actuator which associates with the photoelectric switch 5. At the blocking position the plates 6 are symmetrically inclined with the feeding line so as to form a funnel-shape orientated downstream. The inclined angle of the plate varies depending on the nature, shape, size, etc. of the dough piece.

The dough piece 1 on the moving conveyor belt 2 comes into contact with the plates and then rolls at this position in a direction R due to the contact friction between the dough piece blocked by the plates and the moving conveyor belt 2.

Figure 3:
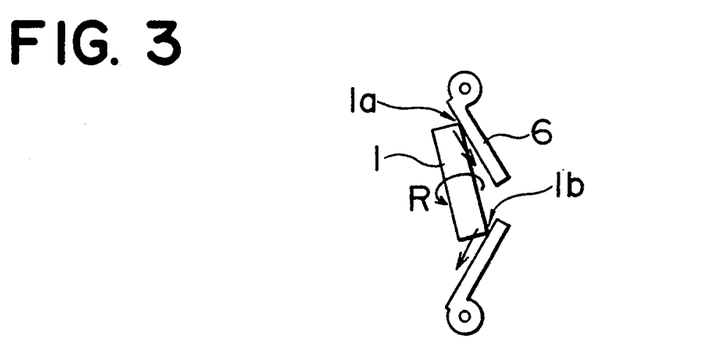
FIG. 3 is a schematic plan view of the dough-aligning device showing its function.

As will be seen from FIG. 3, when one end 1a of the dough piece 1 contacts one of the plates 6 at its outer part and the other end 1b contacts the other plate, the ends 1a and 1b move along the plates 6 in directions shown by arrows. Since the dough piece 1 is rolling, it easily moves transversely of the feeding line 8. Thus, the dough piece is moved to a central position between the stopper plates 6. At that position, the longitudinal axis of the dough piece is perpendicular to the feeding line 8, and the center of the dough piece is aligned with the feeding line 8. The plates lie at the blocking position for a preset period and then return to the releasing position to allow the dough piece to be freely transferred on the moving conveyor belt. Then, the individual leading dough pieces are aligned in turn and transferred on the feeding line 8, even if they are different in length 10 and 11 as shown in FIG. 1.

Figure 4:
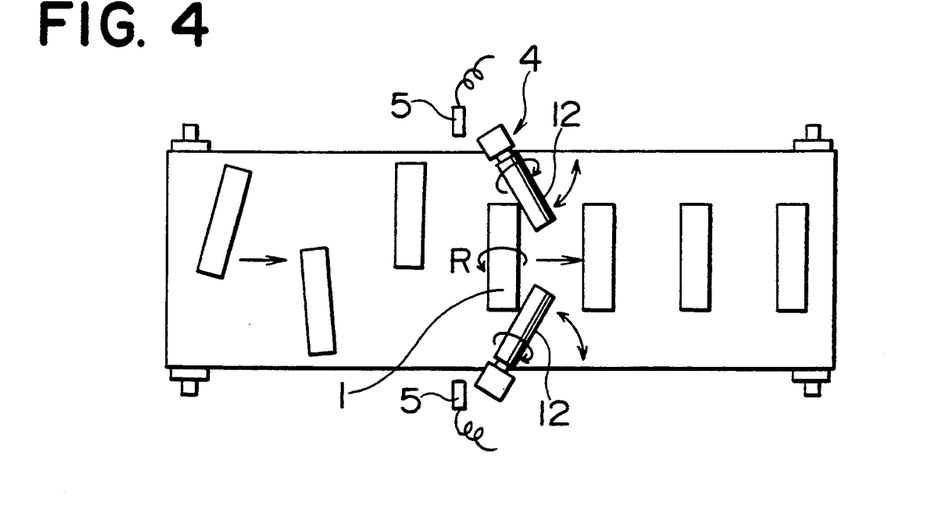
FIG. 4 is a schematic plan view of a modification of the device of FIG. 1.

FIG. 4 shows a modified example of the above aligning device 4. In this example a pair of cylindrical stopper rollers 12 are pivotally mounted on the pivots 7. The cylindrical stopper rollers 12 are forcibly rotated by motors (not shown) in a direction of rotation opposite the direction R of rotation of the dough piece 1. The rotation of the stopper rollers 12 facilitates the rotation R of the dough piece. In other respects the stopper rollers 12 function in the same manner described above.

In FIGS. 5–12 a device 14 for aligning and bending round elongated dough pieces 13 of the invention is shown. In the drawings conically-shaped croissant dough pieces 13 are shown. The aligning and bending device 14 is suspended from a frame 15 (FIG. 6) secured to a transfer conveyor 3. The device 14 includes two pairs of motors 16 and 17 supported by the frame 15. The motor 16 is fixed to the frame, while the other motor 17 is movably supported. A support member 18 of the motor 17 can slide along an arc groove 21 formed in the frame 15. A connecting member 19 is attached to each pair of motors 16 and 17 such that when the motor 16 is activated the connecting member 19 is made to swing about a first vertical axis A1, namely, the axis of the output shaft of the motor 16, and this results in the motor 17 moving about the same axis. Under the connecting member 19 a stopper 20 is fixedly mounted on the output shaft of the motor 17. The stopper 20 is fixedly mounded on the output shaft of the motor 17.

Figure 5:
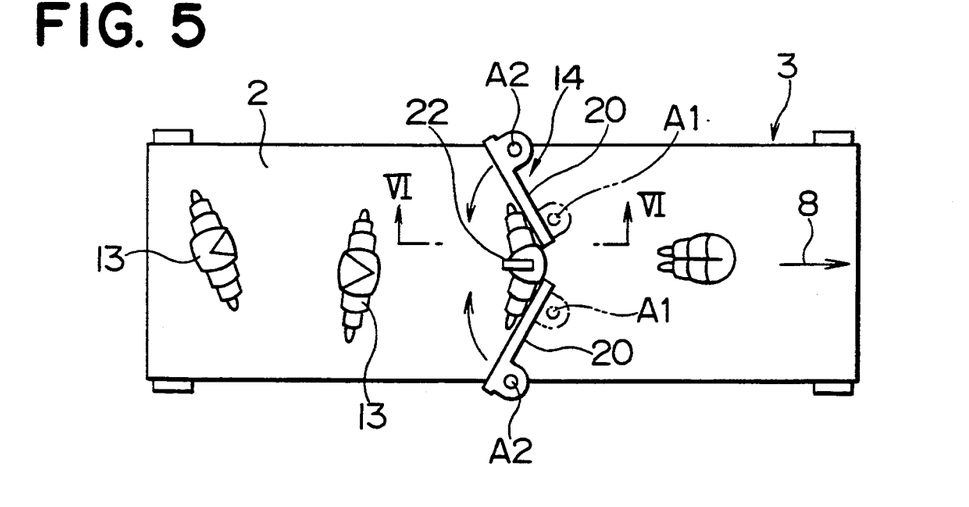
FIG. 5 is a plan view showing an aligning and bending device of the invention mounted on a transfer conveyor carrying croissant dough pieces.

When the access of the dough piece 13 to the stoppers 20 is detected by a photoelectric sensor or switch (not shown) in the same manner as mentioned above, the stoppers 20 are, in this embodiment, in a blocking position as shown in FIG. 5. At the blocking position the stoppers 20 are symmetrically arranged about the feeding line 8 of the transfer conveyor 3 in the shape of a funnel orientated downstream of the conveyor. The dough piece 13 is blocked by the stoppers and is then aligned with the feeding line 8 in the same manner as described above.

Figure 12:
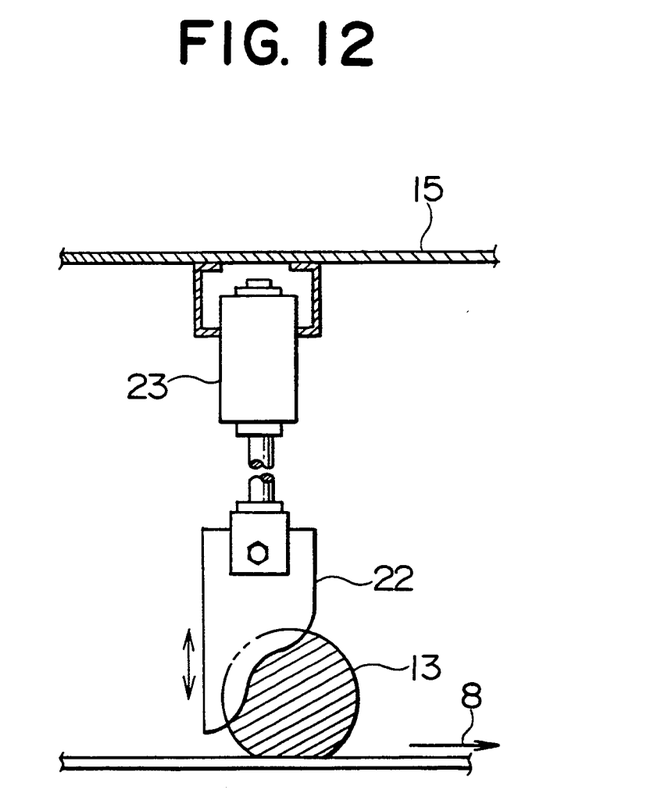
FIG. 12 is a side view of a part of the device of this invention showing a holding member which associates with the bending device.

Between the two stoppers 20, equidistant from the two motors 17, a holding member 22 is disposed as shown in FIG. 12. The holding member 22 is vertically moved by an air cylinder 23 supported by the frame 15. Therefore, the holding member 22 moves toward and away from the dough piece 13 to hold and release it. The holding member 22 is configured such that it can hold the dough piece at its central portion.

Figure 7:
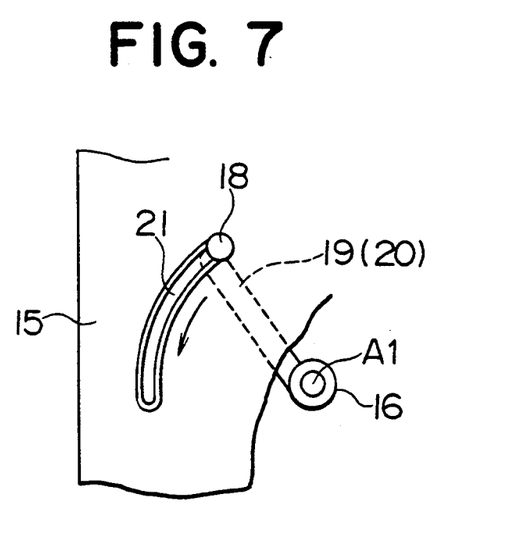
FIG. 7 is a top plan view of a part of the frame taken in the direction of arrow VII of FIG. 6.
Figure 8:
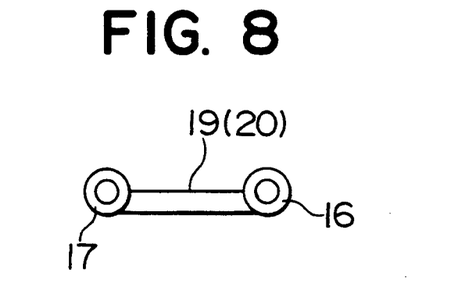
FIGS. 8 is a sectional plan view of a connecting member taken along line VIII—VIII of FIG. 6.
Figure 9:
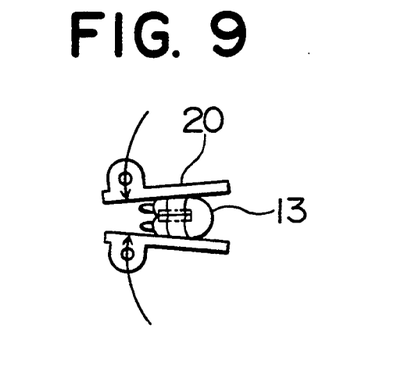
FIGS. 9 is a sectional plan view of a pair of stoppers taken along line IX—IX of FIG. 6.

After the croissant dough piece 13 is aligned at the central position between the stopper plates 20 and 20, the holding member 22 is lowered. The dough piece 13 is held by it and at that moment stops rolling on the moving conveyor belt. At this moment the connecting members 19 and the stopper plates 20 are inwardly rotated about the first vertical axes A1 by the motors 16. The plates 20 are rotated until they become parallel to each other or beyond the parallel position so that the stoppers diverge in the downstream direction, as shown in FIGS. 7, 8, and 9. Thus, the dough piece is symmetrically bent at its center into two portions. The motors 16 are then shut down.

Figure 10:
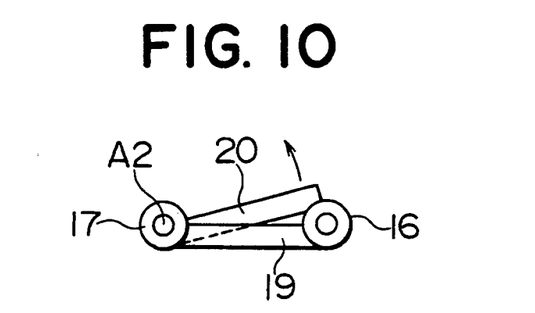
FIGS. 10 and 11 are sectional plan views similar to FIGS. 8 and 9.
Figure 11:
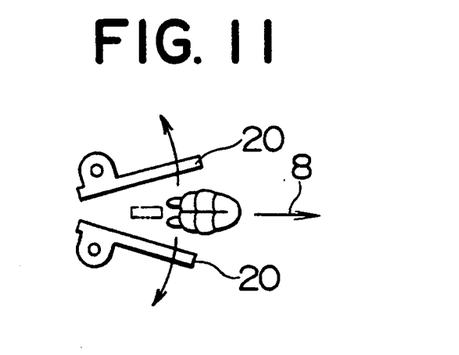

Then, the plates 20 are outwardly rotated about second vertical axes A2, by activating the motors 17, to release and allow the dough piece to be freely transferred on the moving conveyor belt 2, as shown in FIGS. 10 and 11. Then, the connecting members 19 and the stopper plates 20 are returned to the blocking position, shown in FIGS. 5 and 7.

Figure 13:
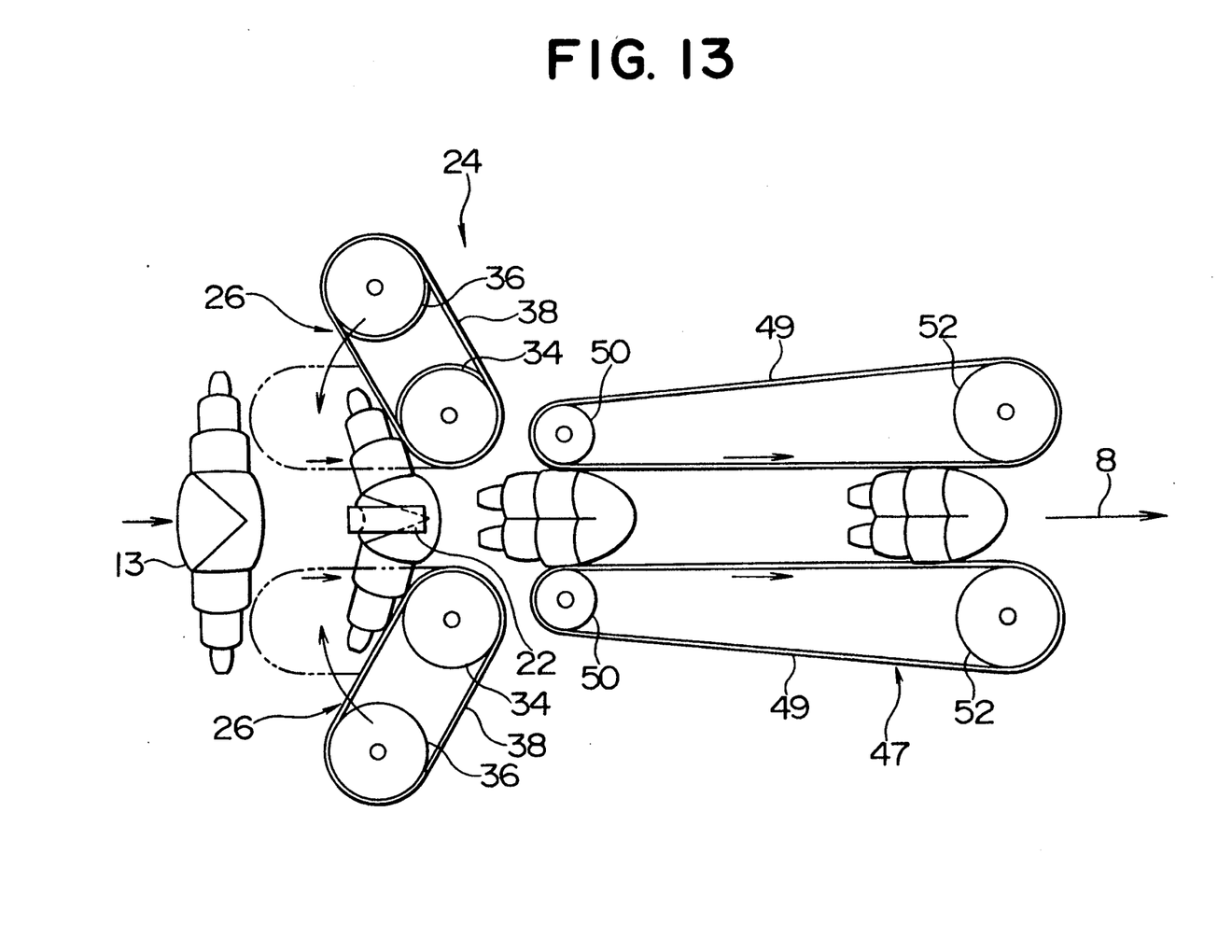
FIG. 13 is a plan view of another aligning and bending device.
Figure 14:
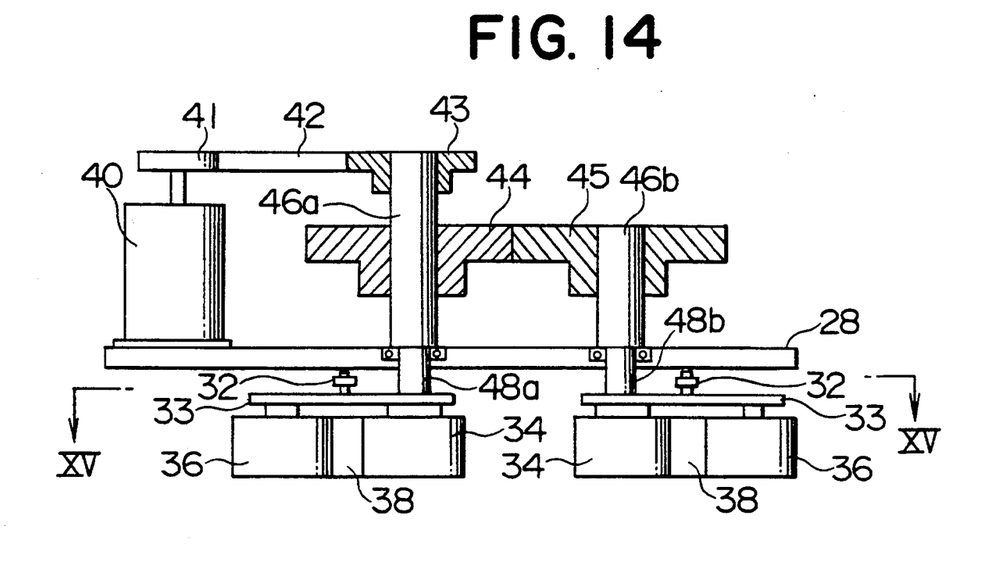
FIG. 14 is a partly sectional side view of a device for moving the aligning and bending device of FIG. 13.
Figure 15:
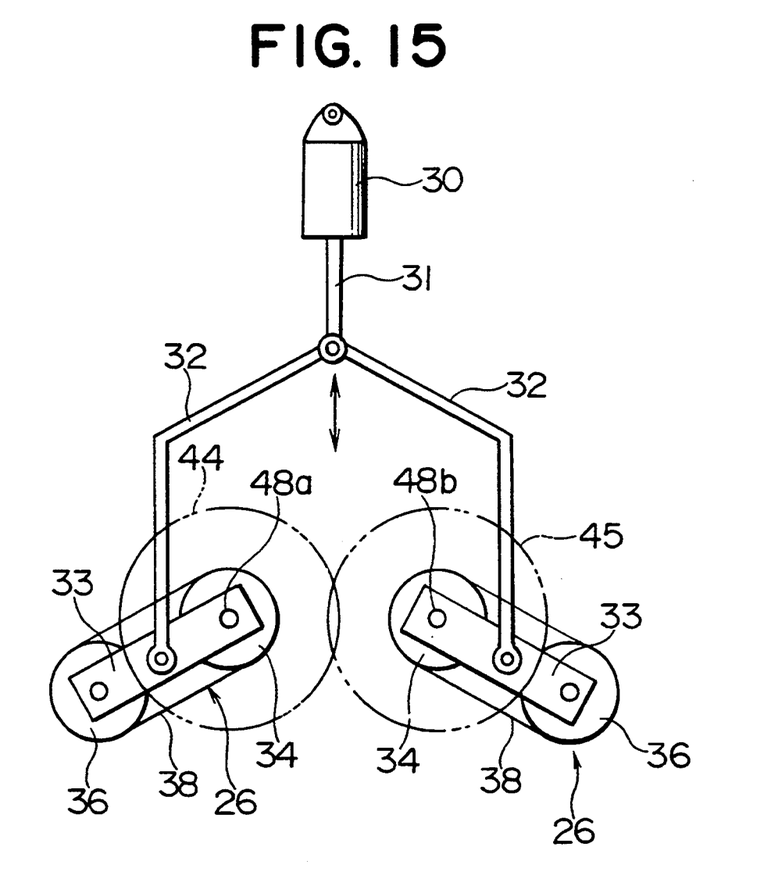
FIG. 15 is a plan view taken along line XV—XV of FIG. 14 of a device for rotating the aligning and bending device so as to bend a dough piece.

In FIGS. 13, 14, and 15 a device 24 for aligning and bending a round elongated dough piece is shown. This device 24 is supported by a frame 28 (FIG. 14) disposed above a transfer conveyor (not shown). The frame 28 is mounted on the transfer conveyor. The device 24 includes a pair of stoppers 26 and a hydraulic or pneumatic cylinder 30 for rotating the stoppers 26 through its piston rod 31 and a pair of arms 32. The arms 32 are pivotally mounted on a distal end of the piston rod 31.

The stoppers 26 act as a blocking means and as a bender for bending an elongated dough piece 13 in association with the holding member 22 described above. Each of the stoppers 26 includes a drive pulley 34 and a driven pulley 36. The pulleys 34 and 36 are rotatably mounted on a bearing plate IS. An endless belt 38 is wound around the pulleys 34 and 36. The arm 32 pivotally engages the bearing plate 33 at its central portion.

Each drive pulley 34 is secured to a lower end 48a or 48b of a rotary shaft 46a or 46b. The rotary shafts 46a and 46b are rotatably fixed to the frame 28. Gears 43 and 44 are fitted on the rotary shafts 46a, while a gear 45 is fitted on the rotary shaft 46b. The gears 44 and 45 engage each other. A motor 40 is mounted on the frame 28. The motor 40 rotates the shaft 46a through an output pulley 41, a transmission belt 42, and the gear 43. Therefore, the rotary shafts 46a and 46b rotate synchronously, and the belts 38 move synchronously.

The round elongated or croissant dough piece 13 on the moving conveyor belt comes into contact with the stoppers 26 which have been symmetrically inclined with the feeding line 8 of the transfer conveyor in the shape of a funnel. The dough piece 13 is moved to a central position between the stoppers 26 and 26 by the aligning action of the stoppers, described above. The holding member 22 is lowered in the same manner. Then, the cylinder 30 is activated to inwardly rotate the stoppers 26 about the lower portions 48a and 48b of the rotary shafts 46a and 46b until the stoppers become parallel as shown in FIG. 13 in imaginary lines. By this rotation of the stoppers 26, the dough piece is bent for a very short period.

Then, the holding member 22 is raised, and the motor 40 is activated, to move or release the bent dough piece on the transfer conveyor. The dough piece moves freely downstream on the conveyor belt. As the endless belts 26 remain parallel and move at the same speed as the conveyor belt, the dough piece is held in the bent shape and transferred downstream.

In this embodiment a belt drive 47 is disposed downstream and adjacent the stoppers 26. The belt drive 47 includes a pair of movable belts 49 spaced apart a distance equal to the width of the bent dough piece. The movable belts 49 are preferably endless and wound around drive pulleys 50 and driven pulleys 52. The moving speed of these belts 49 is equal to that of the conveyor belt. Since the bent dough piece passes between the belts 49 and 49, the shape of the bent dough piece Is maintained for a further period. Thus, shaping the dough piece is reliably completed. The stoppers 26 are returned to the blocking position, shown in FIG. 13 in continuous lines, so as to block each of the following dough pieces.

Figure 16:
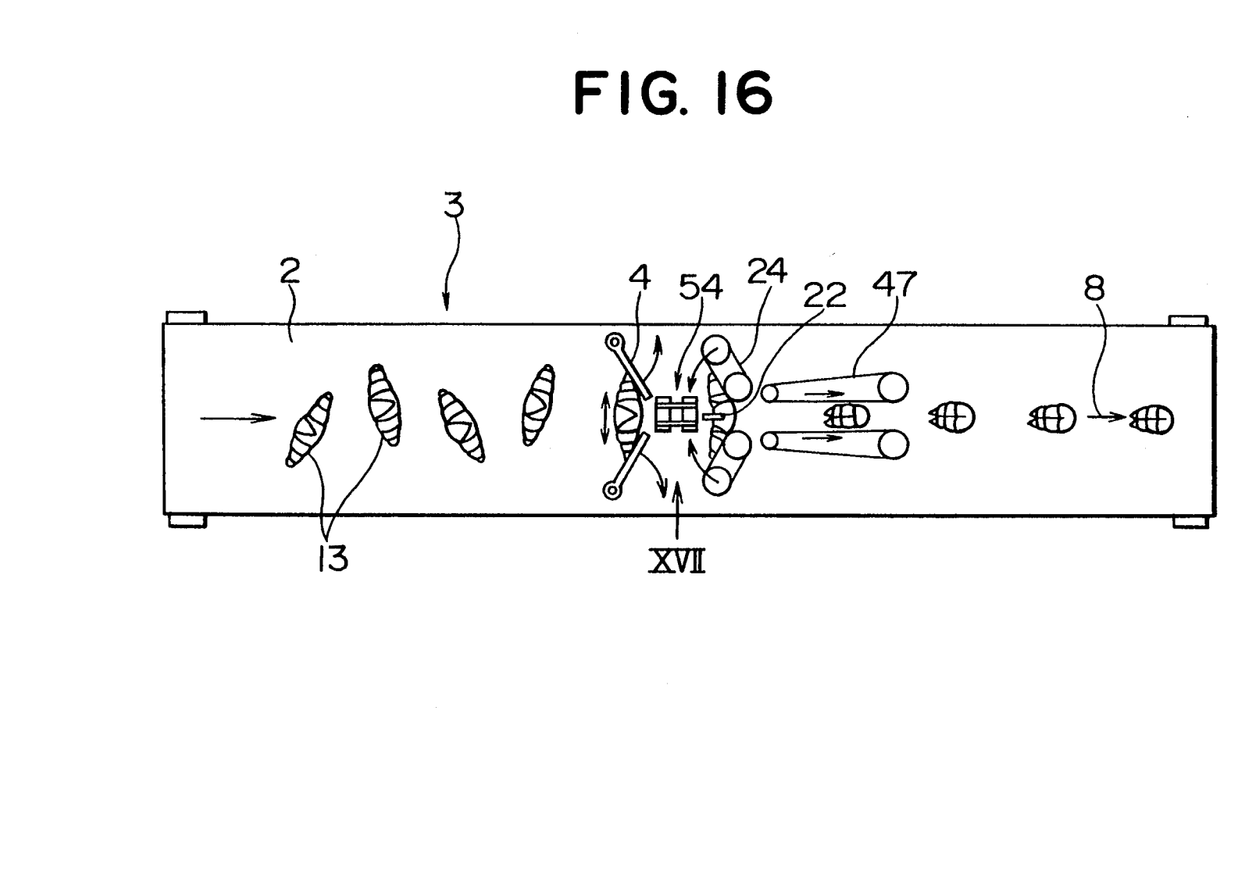
FIG. 16 is a plan view of an aligning and bending device of the invention comprised of an aligning device and a bender.
Figure 17:
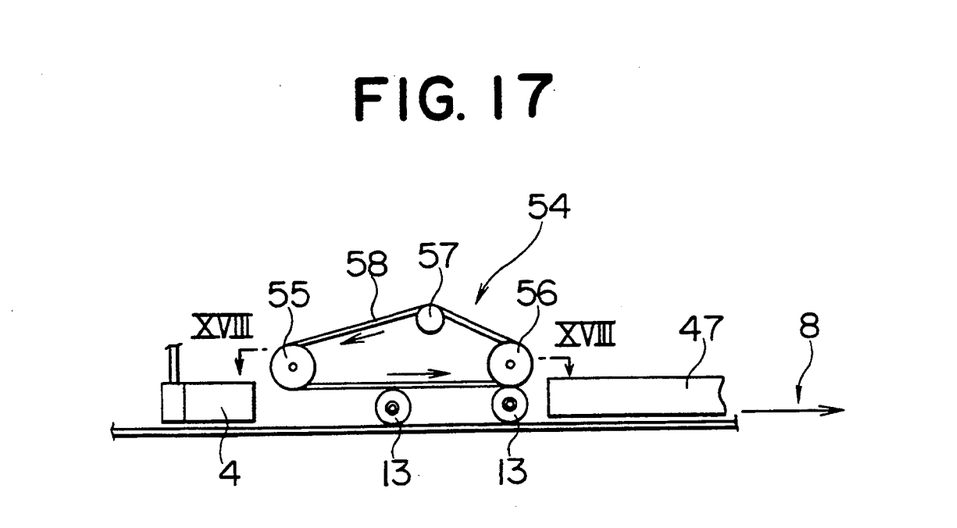
FIG. 17 is a side view taken in the direction of arrow XVII of FIG. 16 of a movable holding belt device.
Figure 18:
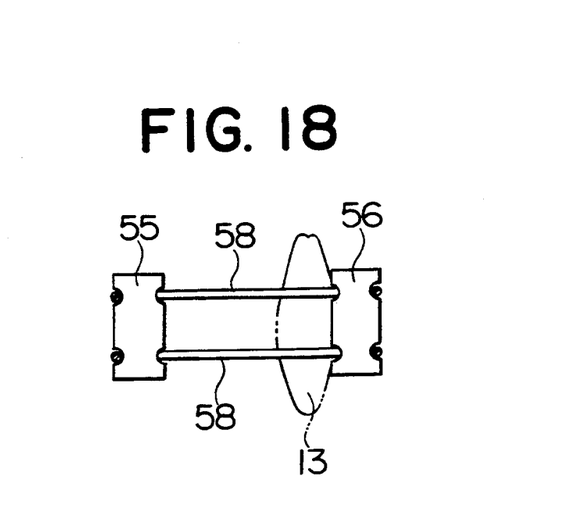
FIG. 18 is a sectional plan view taken along line XVIII—XVIII of FIG. 17 of the movable holding belt device.

FIGS. 16, 17, and 18 show a device for aligning and bending a round elongated or croissant dough piece. The device is comprised of the aligning device 4 and the bender 24, described above.

A plurality of croissant dough pieces are aligned with the feeding line 8 by the aligning device 4 in the same manner and passed to the bender 24. The bender 24 includes the stoppers 26, 26 extending transversely of the feeding line 8 of the transfer conveyor 3. The stoppers 26 are rotated in the same manner to bend and release the dough piece.

A holding-belt device 54 is disposed between the alignment device 4 and the bender 24. The holding-belt device 54 is suspended from the frame. The device 54 holds the top portion of the dough piece during its transfer from the aligning device to the bender, so that the dough piece remains in the aligned position. The holding-belt device 54 includes a drive pulley 55, which is actuated by a motor (not shown), a driven pulley 58, and a tension pulley 57. A pair of belts 58 are wound around the pulleys 55, 56, and 57. Each of the belts 58 has a round cross section. The belts 58 are moved at the same speed as the conveyor belt 2. Although the two round belts 58 are shown in the drawings, alternatively, one round or flat belt may be used.

In this embodiment, as the alignment device 4 and the bender 24 are arranged along the feeding line 8, the individual dough pieces are continuously processed, and as a result processing time is reduced. This causes a rise in productivity.

The foregoing sequential operations for aligning and/or bending and releasing the round elongated dough pieces may controlled by any known control devices, including a timer, a sequencer, etc. after the access of each dough piece to the stoppers or aligning device is detected by the sensor means.

We claim:

1. A method for aligning a round elongated dough piece with a feeding line of a transfer conveyor, comprising the steps of:

moving the transfer conveyor so as to transfer the round elongated dough piece placed randomly thereon;

arranging a pair of stoppers above the transfer conveyor such that the stoppers are symmetrically inclined with respect to the feeding line so as to block the round elongated dough piece, thereby causing the round elongated dough piece to roll on the moving transfer conveyor and move transversely onto the feeding line; and moving the stoppers to their releasing position so that the dough piece is not blocked by the stoppers on the transfer conveyor.

2. The method of claim 1, wherein the round elongated dough piece is made to be positioned on the feeding line such that the longitudinal axis of the dough piece is substantially perpendicular to the feeding line and such that the center of the dough piece is aligned with the feeding line.

3. The method of claim 1, further comprising a step of pivoting each stopper about its horizontal axis, thereby facilitating the rolling of the round elongated dough piece on the transfer conveyor.

4. The method of claim 1, further comprising a step of transferring the dough piece downstream for a bending process by a bender.

5. The method of claim 4, further comprising a step of holding the moving dough piece on the feeding line by a moving belt during transfer of the dough piece from the stoppers to the bender.

6. A method for aligning with a feeding line of a transfer conveyor and bending a round elongated dough piece, comprising the steps of:

moving the transfer conveyor so as to transfer the round elongated dough piece placed randomly thereon;

arranging a pair of stoppers above the transfer conveyor such that the stoppers are symmetrically inclined with respect to the feeding line so as to block the round elongated dough piece, thereby causing the dough piece to roll on the moving transfer conveyor and move transversely onto the feeding line;

holding the dough piece at its central portion;

moving the stoppers inwardly to bend the dough piece; and moving the stoppers to release the dough piece.

7. The method of claim 6, further comprising a step of causing the bent dough piece to pass between a pair of press belts.

* * * * *